(12) United States Patent
Ashner et al.

(10) Patent No.: US 10,432,737 B2
(45) Date of Patent: Oct. 1, 2019

(54) GEOPARTITIONED DATA CACHING

(71) Applicant: Engine Media, LLC, Princeton, NJ (US)

(72) Inventors: Louis Clayton Ashner, New York, NY (US); John Patrick Roach, New York, NY (US); Mickey Alexander Schwab, Chicago, IL (US); Michael Zacharski, Pawling, NY (US)

(73) Assignee: ENGINE MEDIA, LLC, Princeton, NJ (US)

( * ) Notice: Subject to any disclaimer, the term of this patent is extended or adjusted under 35 U.S.C. 154(b) by 0 days.

(21) Appl. No.: 15/782,569

(22) Filed: Oct. 12, 2017

(65) Prior Publication Data

US 2019/0116230 A1    Apr. 18, 2019

(51) Int. Cl.
| | |
|---|---|
| H04L 29/08 | (2006.01) |
| H04W 4/21 | (2018.01) |
| G06F 16/29 | (2019.01) |
| G06F 12/0813 | (2016.01) |
| G06F 12/0846 | (2016.01) |
| G06Q 30/02 | (2012.01) |
| H04W 4/02 | (2018.01) |

(52) U.S. Cl.
CPC .......... *H04L 67/18* (2013.01); *G06F 12/0813* (2013.01); *G06F 12/0848* (2013.01); *G06F 16/29* (2019.01); *G06Q 30/0261* (2013.01); *H04W 4/023* (2013.01); *H04W 4/21* (2018.02)

(58) Field of Classification Search
CPC ..... H04L 67/18; G06F 16/29; G06F 12/0813; G06F 12/0848; G06Q 30/0261; H04W 4/023

See application file for complete search history.

(56) References Cited

U.S. PATENT DOCUMENTS 7,325,097 B1    1/2008  Darcy
8,831,987 B2    9/2014  Knapp et al.
(Continued)

FOREIGN PATENT DOCUMENTS

GB    2497412    * 11/2012    ........... H04W 4/029

OTHER PUBLICATIONS

Amiri, Khalil, et al. "DBProxy: A dynamic data cache for Web applications." Proceedings 19th International Conference on Data Engineering (Cat. No. 03CH37405). IEEE, 2003. (Year: 2003).*
(Continued)

*Primary Examiner* — Michael Bekerman
*Assistant Examiner* — Scott Snider
(74) *Attorney, Agent, or Firm* — K&L Gates LLP

(57) ABSTRACT

Geopartitioned data caching is disclosed. For example, a data source is connected over a network to a geographically remote data cache in communication with a load balancer service. A processor on the data cache executes to receive, from the data source, a plurality of data entries in the data cache, where the plurality of data entries is selected based on a geographical region of the data cache. A data request for a data entry of the plurality of data entries is received from the load balancer service, where a requestor of the data request is in a second geographical region proximately located with the data cache. The data entry is sent to the load balancer service, where the load balancer service forwards the data entry to a receiver.

32 Claims, 11 Drawing Sheets

(56) References Cited

U.S. PATENT DOCUMENTS

| | | | |
|---|---|---|---|
| 8,983,859 B2 | 3/2015 | Nice et al. | |
| 8,983,860 B1 | 3/2015 | Beda, III et al. | |
| 9,817,877 B2 | 11/2017 | Taranov | |
| 9,832,128 B1 | 11/2017 | Ashner et al. | |
| 2003/0065763 A1* | 4/2003 | Swildens | H04L 12/14 709/224 |
| 2004/0075552 A1* | 4/2004 | Rao | G08B 21/10 340/539.1 |
| 2007/0260514 A1* | 11/2007 | Burdick | G06Q 30/02 705/14.46 |
| 2008/0065479 A1 | 3/2008 | Tomlin et al. | |
| 2008/0228564 A1 | 9/2008 | de Heer et al. | |
| 2009/0187705 A1 | 7/2009 | Bernardi et al. | |
| 2010/0145809 A1 | 6/2010 | Knapp et al. | |
| 2011/0040635 A1 | 2/2011 | Simmons et al. | |
| 2011/0246297 A1* | 10/2011 | Buchalter | G06Q 30/02 705/14.53 |
| 2012/0022965 A1 | 1/2012 | Seergy | |
| 2012/0310729 A1 | 12/2012 | Dalto et al. | |
| 2013/0066705 A1 | 3/2013 | Umeda | |
| 2013/0117427 A1* | 5/2013 | Amano | G06F 9/4416 709/223 |
| 2013/0198388 A1* | 8/2013 | Dahn | H04L 63/1416 709/226 |
| 2013/0225176 A1* | 8/2013 | Kurabayashi | H04W 36/023 455/437 |
| 2014/0006170 A1* | 1/2014 | Collette | G06Q 30/0275 705/14.71 |
| 2014/0032326 A1 | 1/2014 | Li et al. | |
| 2014/0058849 A1 | 2/2014 | Saifee et al. | |
| 2015/0051986 A1 | 2/2015 | Saifee et al. | |
| 2015/0073909 A1* | 3/2015 | Peden | G06Q 30/0276 705/14.58 |
| 2015/0112811 A1 | 4/2015 | Connors et al. | |
| 2015/0120468 A1 | 4/2015 | Knapp et al. | |
| 2015/0154650 A1 | 6/2015 | Umeda | |
| 2015/0310500 A1 | 10/2015 | Nolet et al. | |
| 2015/0310512 A1 | 10/2015 | Malaksamudra et al. | |
| 2016/0036835 A1* | 2/2016 | Lietz | H04L 63/1416 726/22 |
| 2016/0080259 A1 | 3/2016 | Biancaniello | |
| 2016/0217150 A1 | 7/2016 | Davis et al. | |
| 2016/0292047 A1 | 10/2016 | Bender et al. | |
| 2016/0352827 A1 | 12/2016 | Procopio et al. | |
| 2017/0103429 A1* | 4/2017 | Sura | G06Q 30/0264 |
| 2017/0235950 A1 | 8/2017 | Venkatesh et al. | |
| 2018/0074714 A9 | 3/2018 | Zohar et al. | |
| 2018/0075083 A1 | 3/2018 | Lee et al. | |

OTHER PUBLICATIONS

Liu, Dong, et al. "Caching at the wireless edge: design aspects, challenges, and future directions." IEEE Communications Magazine 54.9 (2016): 22-28. (Year: 2016).*

B. Levine, Ad Exchange bRealTime Launches Biddr+ for Header Bidding, Jan. 19, 2017.

Amazon Web Services, Advertising Serving, May 2012.

Amazon Web Services, Building a Real-Time Bidding Platform on AWS, Feb. 2016, https://d0.awsstatic.com/whitepapers/Building_a_Real_Time_Bidding_Platform_on_AWS_v1_Final.pdf.

Amazon Elastic Compute Cloud, User Guide for Linux Instances, pp. 706-721, http://docs.aws.amazon.com/AWSEC2/latest/UserGuide/ec2-ug.pdf, downloaded Mar. 21, 2017.

PCT Search Report and Written Opinion dated Jan. 4, 2019 issued for International PCT Application No. PCT/US2018/055567 filed on Oct. 12, 2018.

* cited by examiner

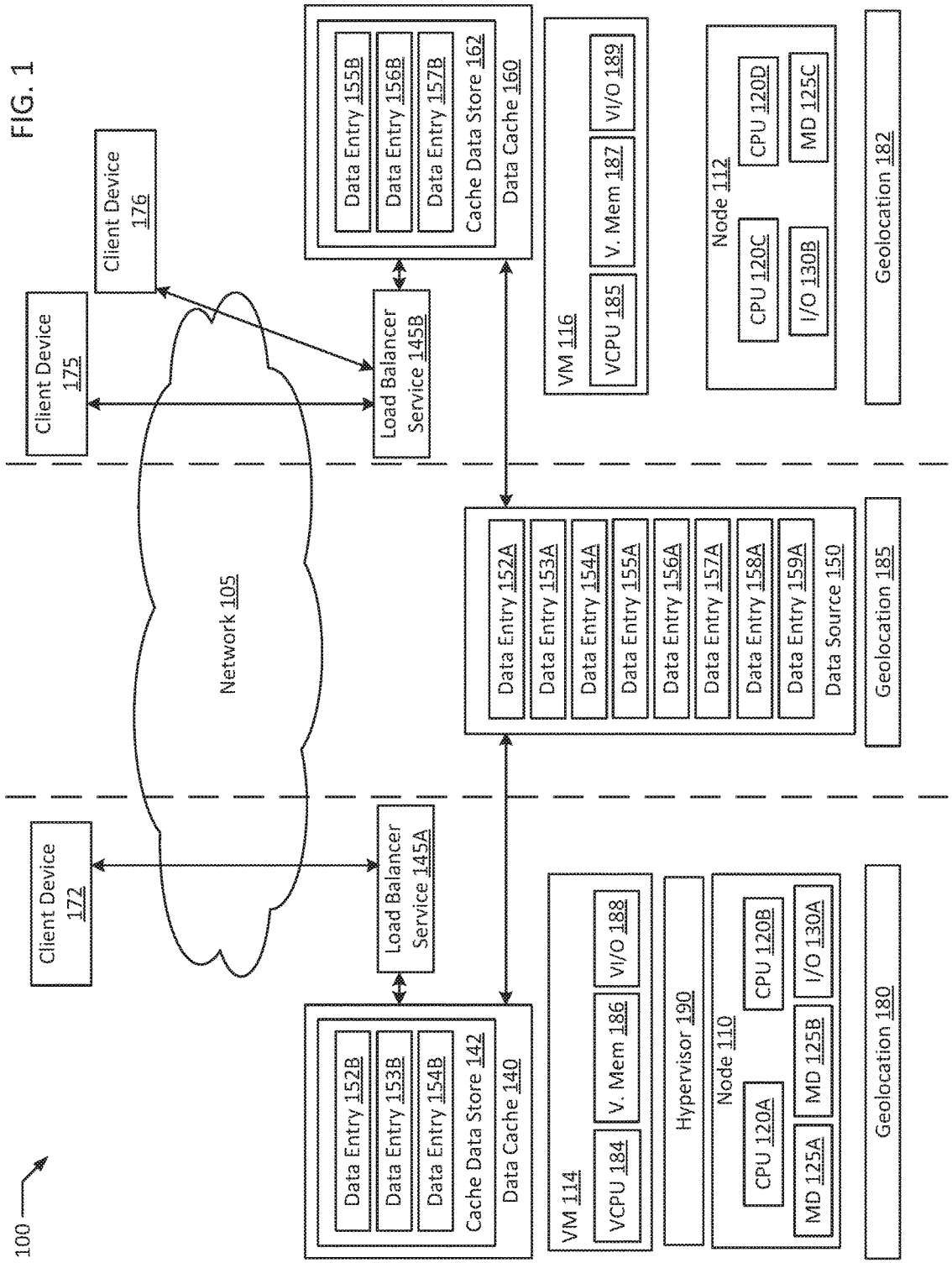

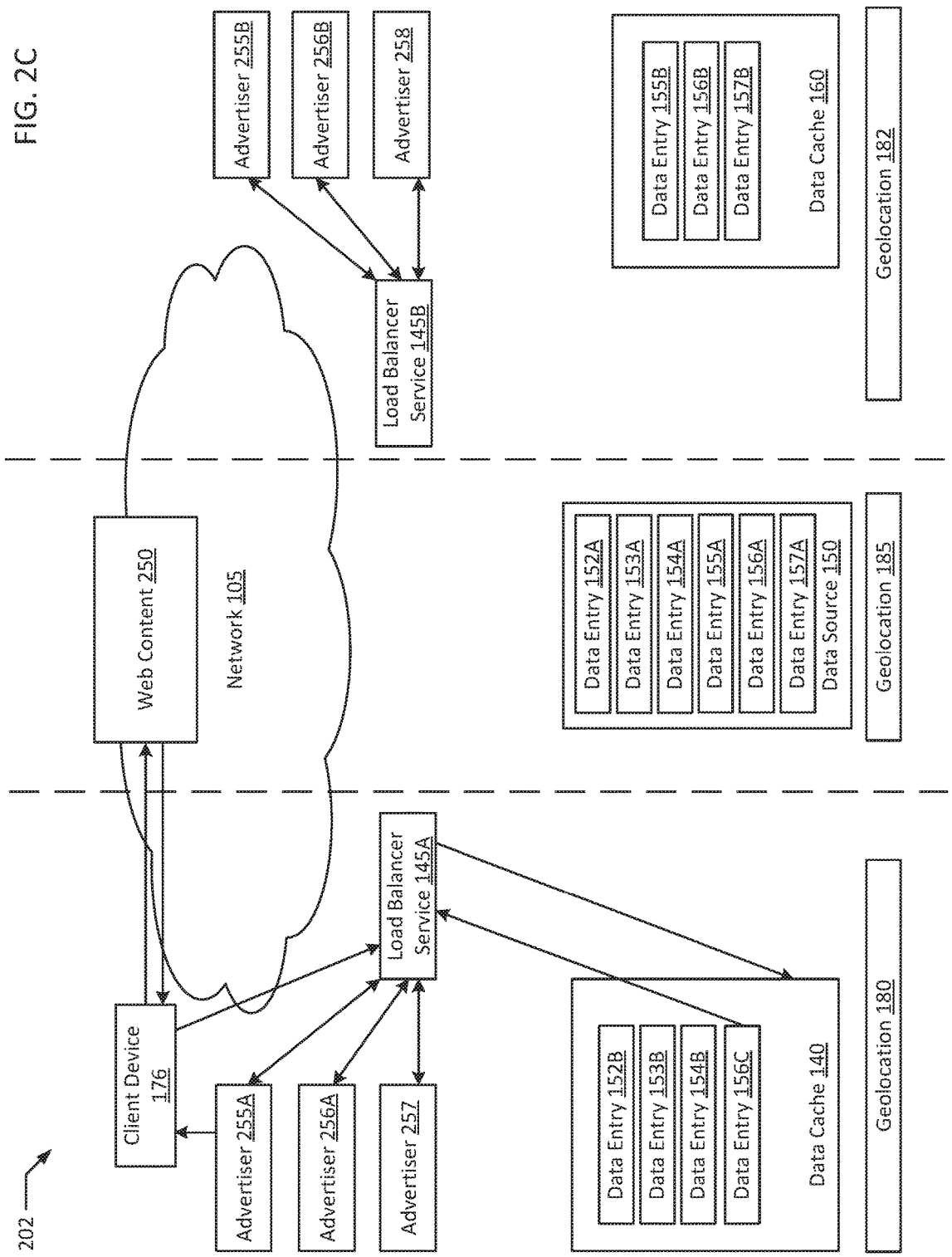

GEOPARTITIONED DATA CACHING

BACKGROUND

The present disclosure generally relates to content delivery to network accessible devices such as the delivery of advertisements and alerts. As microprocessors have become more efficient, and network connectivity more prevalent, an ever increasing amount of devices now have internet or intranet enabled capabilities and features. With the network capabilities of network accessible devices, come opportunities for users to consume content, and therefore opportunities for publishers of content to provide alerts and/or advertise to these users. Advertisers are presented with ever increasing opportunities to reach their increasingly accessible consumers through a myriad of network accessible devices used by these consumers on a daily basis. To maximize the value of each advertisement opportunity, it is typically advantageous for publishers of content to offer an advertisement opportunity to as many potential advertisers as feasible. Similarly, network accessible devices present a direct method of reaching a large audience for the delivery of geographically targeted alerts for both natural disasters and man-made incidents. Improving the speed and reliability of content delivery across a network is important for providing consumers using network accessible devices with a satisfactory user experience.

SUMMARY

The present disclosure provides a new and innovative system, methods and apparatus for geopartitioned data caching. In an example, a system of geopartitioned data caching comprises a data source connected over a network to a data cache of a plurality of data caches, where the data cache is geographically remote from the data source. A load balancer service communicates with the data cache. One or more processors on the data cache execute to receive, from the data source, a plurality of data entries in the data cache, where the plurality of data entries is selected based on a geographical region of the data cache. A data request for a data entry of the plurality of data entries is received from the load balancer service, where a requestor of the data request is in a second geographical region proximately located with the data cache. The data entry is sent to the load balancer service, where the load balancer service forwards the data entry to a receiver.

Additional features and advantages of the disclosed method and apparatus are described in, and will be apparent from, the following Detailed Description and the Figures.

BRIEF DESCRIPTION OF THE FIGURES

FIG. 1 is a block diagram of a system performing geopartitioned data caching according to an example of the present disclosure.

FIGS. 2A-C are block diagrams of an advertisement bidding system enhanced by a geopartitioned data caching system according to an example of the present disclosure.

DETAILED DESCRIPTION OF EXAMPLE EMBODIMENTS

Figure 2A:
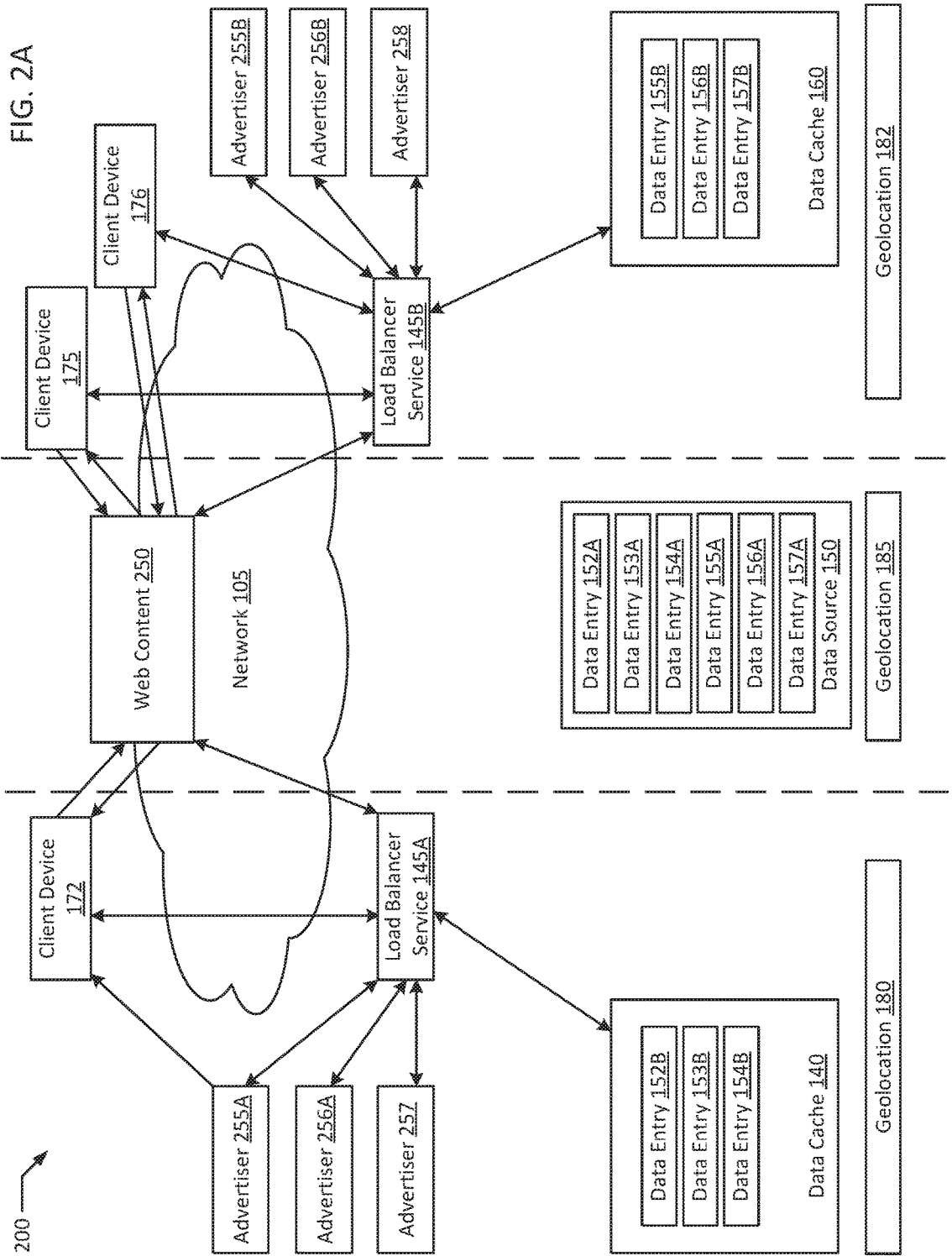

As network accessible devices increasingly gain popularity, content consumption on such devices increases, resulting in people using network accessible devices becoming more informed than ever. These network accessible devices also offer a platform for alerting and informing a large audience about events, from world news and natural disasters, to local show times, concert tickets going on sale, viral videos, social media alerts, and securities prices. Such network retrieved content may typically be monetized through advertising. With many network accessible devices being capable of gathering location data of the devices and their users, an opportunity is presented to cater both advertisements and alerts based on an accurate regional location of the device.

With the vast variety of devices capable of presenting audio and visual advertisements ("ads"), comes numerous opportunities to display ads, and also competition for the advertising opportunities or ad impressions. Typically, a publisher serving content may coordinate with advertisers using a bidding process to display ads in content served to consumers of the publisher's content. A page of content, such as a web page on a web site, may include multiple ad slots where ads may be displayed. In an example, each ad slot, when loaded to a client device and viewed by a user of the client device may result in an ad impression. An ad impression may be an opportunity for an advertiser to reach a given user at a given time, and therefore each time a user loads a given page of content, and/or each time a different user loads the page of content, each ad slot on the page may become a new ad impression. In an example, a publisher may therefore request for advertisers to bid on each ad impression to maximize the value of each respective ad impression. For advertisers, ad agencies, and/or ad exchanges, response time to requests for bids may therefore be critical for maximizing both the likelihood of securing an ad impression as well as the effectiveness of a given ad impression. As users typically expect perceivably immediate responses when accessing content online, the entire process for negotiating, selecting, and displaying an ad may typically be completed in under one second. In a typical day, billions of ads may be served to consumers on network accessible devices. Publishers may be incentivized to maximize the advertisers bidding on each of their ad impressions to generate maximum value from each impression.

In a typical advertising exchange implementation, a user on a network accessible client device may access content supplied by a publisher. The publisher may incorporate ad slots in the content, and then seek prospective buyers (e.g., advertisers) for the ad impressions in the content in real-time while the content is loading, for example, by broadcasting an ad request for each ad slot loaded to the client device as an ad impression. An ad agency may, upon receipt of a request to bid on a given ad slot, seek advertisers either directly or through an advertising exchange to purchase the ad slot. For example, header bidding may be a typical implementation by which publishers and ad agencies request bids for and subsequently serve advertisements. A typical header bidding implementation may be based on the open source project Prebid.js where a typical request for bids on an ad slot may be in the form of a hypertext transfer protocol ("HTTP") GET request with query string parameters related to the particular ad slot, such as a tag id, a referrer, and a size of the ad impression. For example, a header bidding request may be in the form of a Uniform Resource Locator ("URL") without an additional message payload such as, http://www.example.com/getBid?tagid=55&referrer=mysite.com&width=300&height=250. In an example, an HTTP header associated with a request may include additional information pertinent to the request, such as User Agent, Content Type, Content Length, etc. In an example, requests for bids on an ad slot may also be in the form of an HTTP POST request. For example, in implementations based on the open source project Open-RTB, a bid may be in the form of an HTTP POST request with a JavaScript Object Notation ("JSON") payload. A typical JSON payload for an ad slot bid may include attribute-value pairs conveying information regarding the particular ad slot, such as, {"tagid"; "55", "referrer": "mysite.com", "dimensions": {"width": "300", "height": "250"}}. In various examples, different publishers and advertisers may implement different preferred formats of advertisement requests.

In an example, to maintain a positive user experience for the content, a publisher may require response from potential advertisers, ad agencies, and/or ad exchanges within a certain critical time threshold. In the example, network latency may account for a significant proportion of the time spent handling a given request. Another significant source of latency may be the time a downstream actor (e.g., an advertiser seeking to advertise through an ad exchange) takes to respond to a given request. Some sources of latency may typically be outside of the control of a given actor. In an example, a balance may be struck between how many advertisers each ad impression is shopped to by a publisher and the resulting latency from waiting for responses from each advertising partner. In a typical example, an entire ad auction may be completed in under 500 ms, with winning bidders typically responding within 100 ms.

In a content delivery setting, often times news items regarding an ongoing or impending natural disaster or man-made incident may be initially loaded to content servers near the site of the geographically impacting event. In a typical example, such events draw large audiences both being alerted about the event and querying for additional data related to the event. In such examples, often times the local network and storage infrastructure may not be capable of coping with such traffic resulting in outages due to overloading the systems. In some examples, physical damage to the infrastructure (e.g., cellular towers, phone lines, fiber optic lines, satellite relays, etc.), for example, due to a natural disaster, may further reduce the available bandwidth for service.

The present disclosure aims to address both latency and bandwidth as bottlenecks in various content serving scenarios by implementing a geopartitioned data cache that leverages geolocation data along with behavioral and access characteristics for a particular data type to deliver faster and/or more resilient data access. In an example, an advertising service may store user profiles of millions of users to best target ads for each individual user. Storing such records centrally may typically incur upwards of 60-100 ms of latency to access the records, both due to network latency as well as search latency from such a large database. In the example, by implementing a data cache with the profile data on the same server as a load balancer with an auction module, the network latency is reduced by several orders of magnitude down to well under one millisecond. Search times may be significantly reduced as well, for example, down to the 1-5 ms range by limiting the records in these data caches to those most likely to be accessed. In an advertising setting, for the vast majority of users, access will be highly correlated with a home or office location, and therefore primary selection for where to cache a particular user's profile data may be well correlated with a geographical region from which that user typically accesses network content. Therefore, in most scenarios, a particular user profile needs only to be cached in a couple of locations where access is likely, and may be eliminated from other nodes around the world, resulting in a natural reduction in the data stored in each data cache. In such examples, geopartitioned data caching may significantly enhance latency for latency bound data retrieval tasks. A retention time limit for individual records may also be maintained on a data cache level, where a given record may be removed from a data cache after a certain amount of time without being accessed. In an example, a master copy of the data entry may still be retrieved at any time from the data source.

Alternatively, especially in situations where content being retrieved is sourced from a relatively few sources, bandwidth may instead be the limiting bottleneck. For example, if a hurricane is being monitored from a weather station in the Caribbean, that weather station may have a very limited amount of bandwidth connecting it to the internet, and a flood of requests for updates directly to the weather station may well result in what amounts to an unintentional distributed denial of service attack on the host, locking up the system by, for example, triggering an interrupt storm. With geopartitioned data caching, data from the weather station may instead be forwarded to data caches in unaffected regions, for example, Houston, Tex., Nashville, Tenn., and Bethesda, Md. with traffic seeking the data routed to these locations and away from Florida and the Caribbean which will be affected by the storm. In an example, the rerouting of traffic geographically to avoid infrastructure affected by a natural disaster may be triggered automatically by detection devices for such disasters. In the example, such traffic may include advertisement traffic, rerouted through neighboring regions to improve resiliency from storm damage.

FIG. 1 is a block diagram of a system performing geopartitioned data caching according to an example of the present disclosure. In an example, illustrated system 100 depicts the various key parties in a given content delivery system. For example, client devices 172, 175, and 176 may be any form of network accessible device (e.g., phone, tablet, laptop, desktop, server, Internet of Things ("IOT") device, etc.). These devices may access network content over network 105 which may be any type of network, for example, a public network (e.g., the Internet), a private network (e.g., a local area network (LAN) or wide area network (WAN)), or a combination thereof. In an example, devices connected through network 105 may be interconnected using a variety of techniques, ranging from a point-to-point processor interconnect, to a system area network, such as an Ethernet-based network. In the example, load balancer services 145A-B may be associated with any form of content distributor, such as a publisher of content, an advertiser, or some form of intermediary such as an advertisement exchange or auction service.

In an example, load balancer 145A is collocated with data cache 140, with at least one cache data store (e.g., cache data store 142), for example, in the form of a database, containing data entries (e.g., data entries 152B, 153B, 154B). In an example, data cache 140 may be a physical or virtual device configured with memory devices to host a plurality of cache data stores (e.g., cache data store 142), which in turn store data entries (e.g., data entries 152B, 153B, 154B). In various examples, data entries 152B-154B may be associated with different entities. For example, where load balancer service 145A is associated with a video streaming service, data entries 152B-154B may be individual videos. In another example, where load balancer service 145A is associated with an ad agency offering ad auction services, data entries 152B, 153B, and 154B may be user profiles, for example, data entry 152B may be a user profile of a primary user of client device 172. In an example, load balancer service 145A may be configured to serve requests from geolocation 180, which may be a regionally located data center. For example, New York, New Jersey, and Connecticut requests may all be served from a datacenter in Secaucus, N.J. (e.g., geolocation 180). In the example, client device 172 may be located near geolocation 180, for example, in Manhattan, N.Y.

In an example, geolocation 182 may be another location remote from New Jersey with a datacenter, for example, Chicago, Ill. In the example, load balancer service 145B may be a second instance of load balancer service 145A, with load balancer service 145B located in the datacenter in geolocation 182 along with data cache 160 storing data entries 155B, 156B, and 157B in cache data store 162. In the example, client device 175 may be in Milwaukee, Wis. and client device 176 in South Bend, Ind., both accessing content associated with load balancer service 145B.

In an example, data caches 140 and 160 may be associated with data source 150, which may be a master data store with copies of most or all of the data entries (e.g., data entries 152A-159A) maintained by an entity associated with load balancer service 145B. In an example, data entries 152B-154B and 155B-157B may be additional copies of source data entries 152A-157A. Data source 150 may be in a third discrete geolocation 185 (e.g., Houston, Tex.), or collocated with one of the data caches (e.g., data caches 140 and 160). In an example, data source 150 may be implemented in any suitable format. For example, data source 150 may be a collection of servers and/or storage nodes that combine to form a definitive master data store. In another example, data source 150 may be implemented in a tiered or regional format, with a plurality of mid-level nodes each with data corresponding to a larger region than a specific data cache (e.g., north east United States vs. New York City) that are ultimately consolidated in a long term backup storage node. In an example, load balancer services 145A-B may retrieve data from data caches (e.g., data caches 140 and 160). In another example, load balancer services 145A-B may retrieve data directly from data source 150 but may incur a performance decrease doing so. In some examples, load balancer services 145A-B may be configured to be unable to directly access data source 150.

In an example, data source 150, data caches 140 and 160, and cache data stores 142 and 162 may be any form of suitable storage system for data entries (e.g., data entries 152A-159A, 152B-157B), for example, a relational database. The data in data source 150, data caches 140 and 160, and/or cache data stores 142 and 162 may be stored in a database associated with a database management system ("DBMS"). A DBMS is a software application that facilitates interaction between the database and other components of the system 100. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, data in data source 150, data caches 140 and 160, and/or cache data stores 142 and 162 may be stored in a database organized as a formal database with a schema such as a relational schema with defined tables, indices, links, triggers, various commands etc. In some examples, data source 150, data caches 140 and 160, and/or cache data stores 142 and 162 may not be organized as a formal database, but may instead be an alternative storage structure capable of holding the information stored in data source 150, data caches 140 and 160, and/or cache data stores 142 and 162, including but not limited to a file, folder, directory, registry, array, list, etc.

In an example, data cache 140, and load balancer service 145A execute on VM 114 which executes on nodes 110. The system 100 may include one or more interconnected hosts (e.g., nodes 110 and 112). Each of nodes 110 and 112 may in turn include one or more physical processors (e.g., CPU 120A-D) communicatively coupled to memory devices (e.g., MD 125A-C) and input/output devices (e.g., I/O 130A-B). As used herein, physical processor or processors (Central Processing Units "CPUs") 120A-D refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 125A-C refers to a volatile or non-volatile memory device, such as RAM, ROM, EEPROM, or any other device capable of storing data. Each node may also include input/output ("I/O") devices (e.g., I/O 130A-B) capable of providing an interface between one or more processor pins and an external device, the operation of which is based on the processor inputting and/or outputting binary data. CPUs 120A-D may be interconnected using a variety of techniques, ranging from a point-to-point processor interconnect, to a system area network, such as an Ethernet-based network. Local connections within each of nodes 110 and 112, including the connections between a processor 120A and a memory device 125A-B and between a processor 120A and a I/O 130A may be provided by one or more local buses of suitable architecture, for example, peripheral component interconnect (PCI).

In computer systems (e.g., system 100), it may be advantageous to scale application deployments by using isolated guests such as virtual machines and/or containers that may be used for creating hosting environments for running application programs. Typically, isolated guests such as containers and virtual machines may be launched to provide extra compute capacity of a type that the isolated guest is designed to provide. Isolated guests allow a programmer to quickly scale the deployment of applications to the volume of traffic requesting the applications as well as isolate other parts of system 100 from potential harmful code executing within any one virtual machine. In an example, a VM may be a robust simulation of an actual physical computer system utilizing a hypervisor (e.g., hypervisor 190) or a component (e.g., a virtual machine manager) that executes tasks commonly executed by hypervisors to allocate physical resources to the virtual machine. In an example, VM 114 may be a virtual machine executing on top of physical hosts (e.g., node 110), possibly with a hypervisor 190 executing between the virtualized layer and the physical hosts. In an example, data cache 140, and load balancer service 145A may be further virtualized (e.g., in a container).

System 100 may run one or more VMs (e.g., VM 114) by executing a software layer (e.g., hypervisor 190) above the hardware and below the VM 114, as schematically shown in FIG. 1. In an example, the hypervisor 190 may be a component of a host operating system executed by the system 100. In another example, the hypervisor 190 may be provided by an application running on the host operating system, or may run directly on the node 110 without an operating system beneath it. The hypervisor 190 may virtualize the physical layer, including processors, memory, and I/O devices, and present this virtualization to VM 114 as devices, including virtual processor ("VCPU") 184, virtual memory device 186, and virtual I/O ("VI/O") 188. In an example, VM 116 may be another virtual machine, executing on node 112, without a dedicated hypervisor. For example, node 112 may execute an operating system supporting virtualization without a full hypervisor module. In the example, VCPU 185, virtual memory device 187, and VI/O 189 provide virtualized compute resources of node 112 to VM 116.

In an example, VMs 114 and 116 may be virtual machines and may execute guest operating systems which may utilize the underlying virtual central processing unit ("VCPU") 184 or 185, virtual memory device ("VIVID") 186 or 187, and virtual I/O 188 or 189. Data caches 140 and 160, and load balancer services 145A-B may run as applications on VMs 114 and 116 or may be further virtualized and execute in containers. In an example, processor virtualization for VM 114 may be implemented by the hypervisor 190 scheduling time slots on one or more physical processors (e.g., CPU 120A-B) such that from the guest operating system's perspective those time slots are scheduled on a virtual processor 184. In an example, VCPU 184 may be bound to execute on a specific physical processor in node 110. For example, instructions for VCPU 184 may execute on CPU 120A.

VMs 114 and 116 may run on any type of dependent, independent, compatible, and/or incompatible applications on the underlying hardware and host operating system. In an example, data caches 140 and 160, and load balancer services 145A-B running on VMs 114 and 116 may be dependent on the underlying hardware and/or host operating system. In an alternative example, data caches 140 and 160, and load balancer services 145A-B running on VMs 114 and 116 may be independent of the underlying hardware and/or host operating system. In an example, data caches 140 and 160, and load balancer services 145A-B running on VMs 114 and 116 may be compatible with the underlying hardware and/or host operating system. Additionally, data caches 140 and 160, and load balancer services 145A-B may be incompatible with the underlying hardware and/or OS. In an example, data caches 140 and 160, and load balancer services 145A-B may be implemented in any suitable programming language (e.g., Java, C, C++, C-sharp, Visual Basic, structured query language (SQL), Pascal, common business oriented language (COBOL), business process execution language (BPEL), business process model notation (BPMN), complex event processing (CEP), jBPM, Drools, etc.). The hypervisor 190 may manage memory for the host operating system as well as memory allocated to the VM 114 and guest operating systems.

Figure 2B:
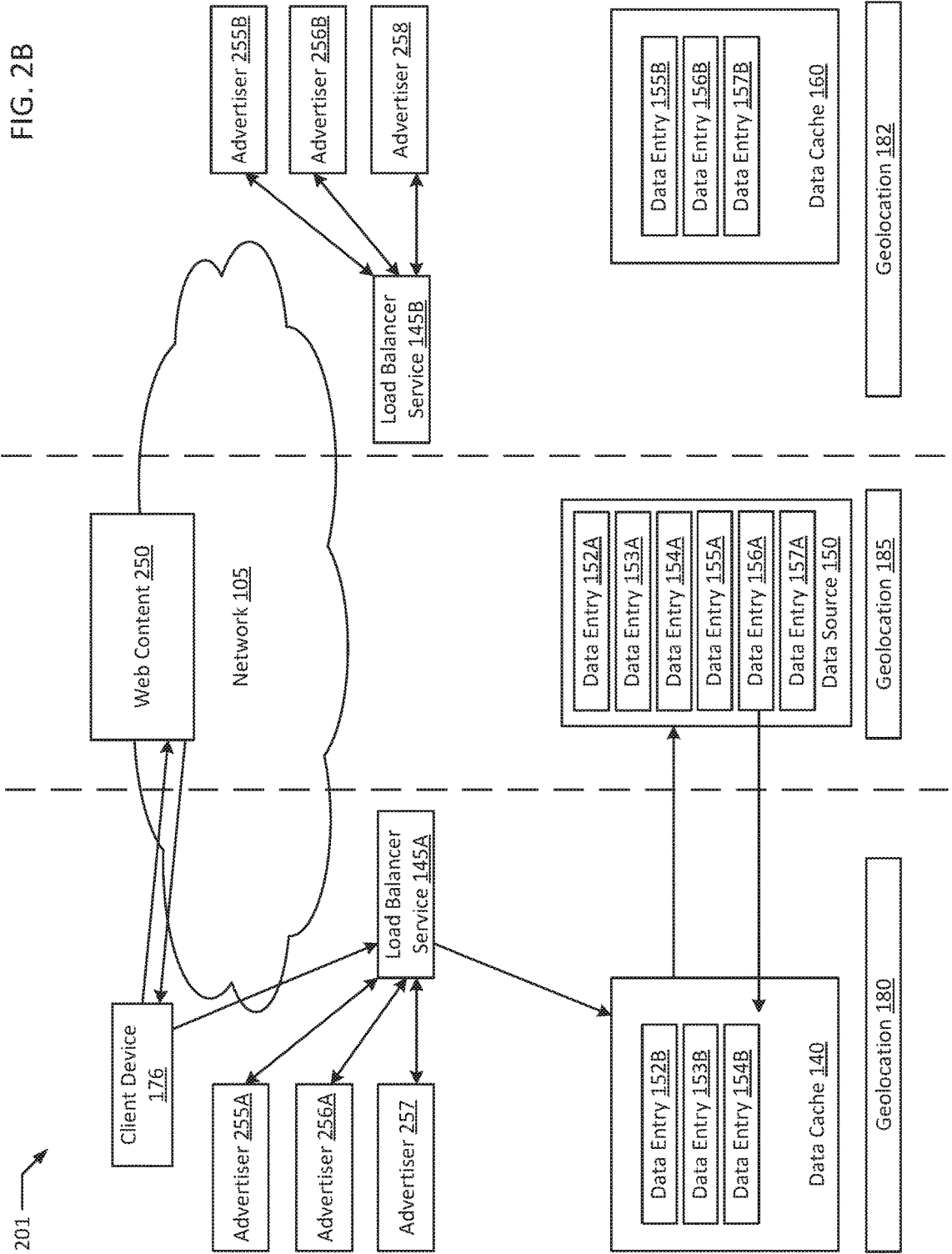

FIGS. 2A-C are block diagrams of an advertisement bidding system enhanced by a geopartitioned data caching system according to an example of the present disclosure. In an example, illustrated system 200 on FIG. 2A may be an embodiment of system 100 where load balancer services 145A-B and data caches 140 and 160 are associated with an ad agency that conducts ad auctions. In the example, the ad agency may be affiliated with a publisher of web content 250. In an example, a publisher may be an entity that provides consumable content (e.g., web content 250) over network 105 to client devices 172, 175, and 176. In an example, a publisher may be a news conglomerate with a world news site (e.g., web content 250), a sports news site, and a celebrity gossip site. In another example, a publisher may be an online gaming company with an online game supported by ads (e.g., web content 250). In an example, network 105 may be a public network (e.g., the internet).

In an example, client device 172 may access web content 250 from Manhattan, N.Y., and web content 250 may be embedded with a header bidding script from the ad agency running load balancer service 145A. The header bidding script may contact load balancer service 145A to run an auction to populate an ad impression in web content 250. In the example, load balancer service 145A may be in a Secaucus, N.J. (e.g., geolocation 180) data center with data cache 140. In an example, a user of client device 172 may reside in New York City and may frequently access ads through load balancer service 145A. From past usage, load balancer service 145A, data cache 140, and/or data source 150 may track client device 172's access patterns and data entry 152B associated with client device 172 may be loaded to data cache 140 due to an association between client device 172 and geolocation 180, for example, client device 172 may generally access content in a service region served by data cache 140. In an example, data source 150 may load profile data entry 152A to data cache 140 as data entry 152B due to address information stored in the user profile, for example, a shipping address or a telephone area code. In an example, a particular client device 172 may exist within the service region of multiple data caches, each of which may receive a copy of data associated with that particular client device 172. For example, if a second data cache was located in Stamford, Conn., client device 172 may also be in the Stamford, Conn. geolocation's service area. In an example, each data cache may typically serve a geographical region of a size determined by absolute distance and/or population. In an example, advertisers 255A, 256A, and 257 may be three advertisers whose data centers are located near Secaucus, N.J. (e.g., geolocation 180). In an example, advertiser 255A may also be in Secaucus, while advertiser 256A may be in Princeton, N.J. and advertiser 257 in Brooklyn, N.Y.

In an example, when the header bidding script in web content 250 contacts load balancer service 145A from client device 172, load balancer service 145A may retrieve data entry 152B from data cache 140, and use data entry 152B to construct bid requests sent to advertisers 255A, 256A and 257. In the example, advertiser 255A may place a winning bid for the ad impression and client device 172 may display an ad from advertiser 255A.

Similarly, geolocation 182 (e.g., Chicago, Ill.) may host a second instance of load balancer service 145A as load balancer service 145B, and a second instance of data cache 140 as data cache 160. In the example, advertisers 255B and 256B may be midwest instances of the same advertisers as corresponding to advertisers 255A and 256A, while advertiser 258 may be a regional advertiser in Minneapolis, Minn. In an example, data entries 155A-B may be profile data for client device 175, while data entries 156A-B may be profile data for client device 176. In an example, under ordinary circumstances, data cache 140 and data cache 160 may have little to no overlap in data entries. For example, if the ad agency operating load balancer services 145A and 145B populate data caches based on city of residence, the overlap between users residing in the New York City metropolitan area and the Chicago metropolitan area but being regularly present in the other city may be very limited.

In an example, illustrated system 201 in FIG. 2B may be a future point in time in system 200 from FIG. 2A. In the example, a user of client device 176 has traveled to New York City and just activated client device 176 (e.g., a smart phone) from Newark Airport in Elizabeth, N.J. to check the local weather (e.g., web content 250). In an example, the ad agency operating load balancer service 145A is associated with the weather site web content 250. In an example, client device 176 first loads a page for Chicago, Ill. weather as a default page for client device 176. For example, a GPS reading on client device 176 may not yet have updated with the change in geolocation to New York City from Chicago after the device was powered on or taken out of "airplane mode." Load balancer Service 145A gets a first request in conjunction with the loading of Chicago, Ill. weather to bid on an ad impression. In the example, load balancer service 145A queries data cache 140 for data entry 156B associated with client device 176. In an example, data cache 140 either rejects the request or lets the request time out when data cache 140 discovers that there is no local copy of data entry 156B. For example, data cache 140 and/or load balancer service 145A may be aware of a deadline for bidding, which may be short on a fast loading weather site, that could not be met if data entry 156A were to be retrieved from data source 150 for the Chicago, Ill. weather page. For example, retrieving data entry 156A may take 60-200 ms, while the bidding window may only be 150 ms. In the example, data cache 140 may request a copy of data entry 156A based on the request for an ad from the Chicago, Ill. weather page. In an example with a publisher that allows a long bidding window, load balancer service 145A and/or data cache 140 may attempt to retrieve data entry 156A from data source 150 during the bidding window.

In an example, illustrated system 202 in FIG. 2C may be a further progression of system 201, where client device 176 retrieves a second page from web content 250, this time weather for New York City. In the example, the user of client device 176 may immediately begin navigating to the New York City page, but may still require 2-3 seconds of time to input the new location into the site. In an example, this 2-3 seconds was more than enough time for data cache 140 to retrieve data entry 156A from data source as data entry 156C. In an example, when loading the New York City weather, load balancer 145A again queries data cache 140 for data entry 156A, and receives data entry 156C from data cache 140. In an example, data cache 140 and load balancer service 145A are collocated and the retrieval of data entry 156C takes under 5 ms. In an example, load balancer service 145A sends bid requests out to advertisers 255A, 256A, and 257, with advertiser 255A winning the bidding and showing an ad on client device 176. In an example, as soon as load balancer service 145A and/or data cache 140 realizes that an unrecognized user is connecting, an attempt is made to retrieve a profile from data source 150. In the example, where the user's profile is present in data source 150, the user's profile data may be immediately cached and ready to use by the next page load attempted on the client device (e.g., client device 176 and data entry 156C). This cached copy will also be prepared and ready for every additional access during the user's trip, and will eventually decay as it becomes stale and hits data cache 140's retention time limit.

In an example, the relatively small cost of failure (ignoring the first request for an ad while loading the Chicago weather page) is compensated for by vastly improved performance during the hundreds of other attempted page loads by client device 176 while visiting New York City. For example, data cache 140 may be one out of twenty regional data caches used by the ad agency, and search times may therefore be five percent or less for searching through the records in data cache 140 as compared to a full search of data source 150. In the example, data cache 140 may store data profiles for local residents plus a few frequent travelers to New York City. The smaller database may be further enhanced, for example, by being small enough to load in dynamic memory or persistent memory rather than being on disk based storage, which may provide even further latency savings. In an advertising example, profile data being slightly dated is also not a major issue, as it is unlikely for a handful of purchases to significantly change a given user's purchasing history profile. For example, to improve performance, profile updates back to data source 150 from data caches 140 and 160 may be conducted nightly during low usage periods (e.g., 2:00-5:00 AM), so data entry 156C loaded to data cache 140 may not account for a purchase made on client device 176 at O'hare airport in Chicago that has been saved to data entry 156B. In the example, on the next nightly reconciliation, data source 150 may combine data entries 156B and 156C into a new unified data entry 156A, or data source 150 may keep any one of the three copies of the user's profile as the master backup profile on data source 150. In an example, the smaller unit size of data cache 140 as compared to data source 150 may allow many instances to be spawned on demand to account for surges in network usage.

Figure 3A:
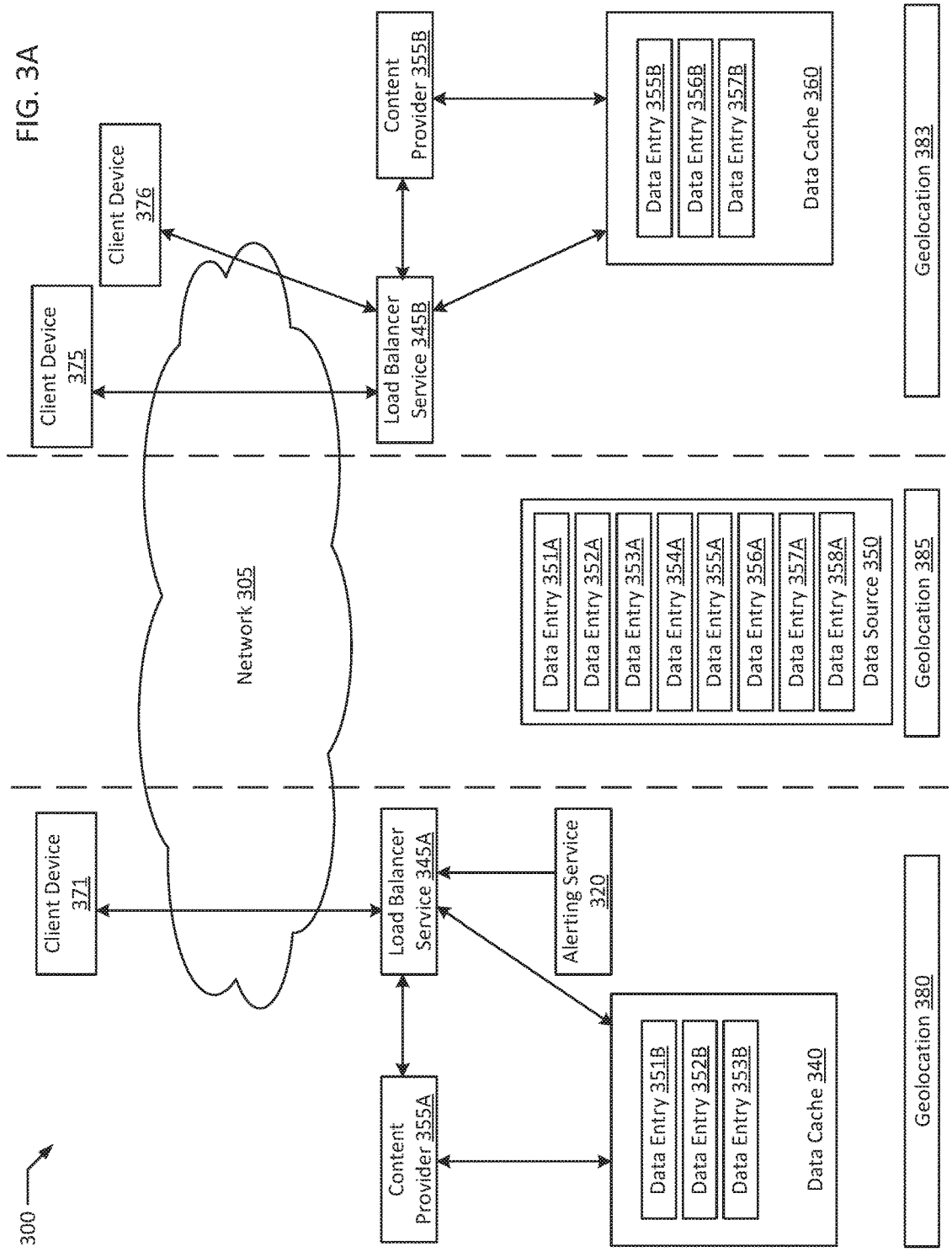
FIGS. 3A-B are block diagrams of a geopartitioned data caching system improving service resiliency and redundancy for delivering content in the event of a natural disaster according to an example of the present disclosure.
Figure 3B:
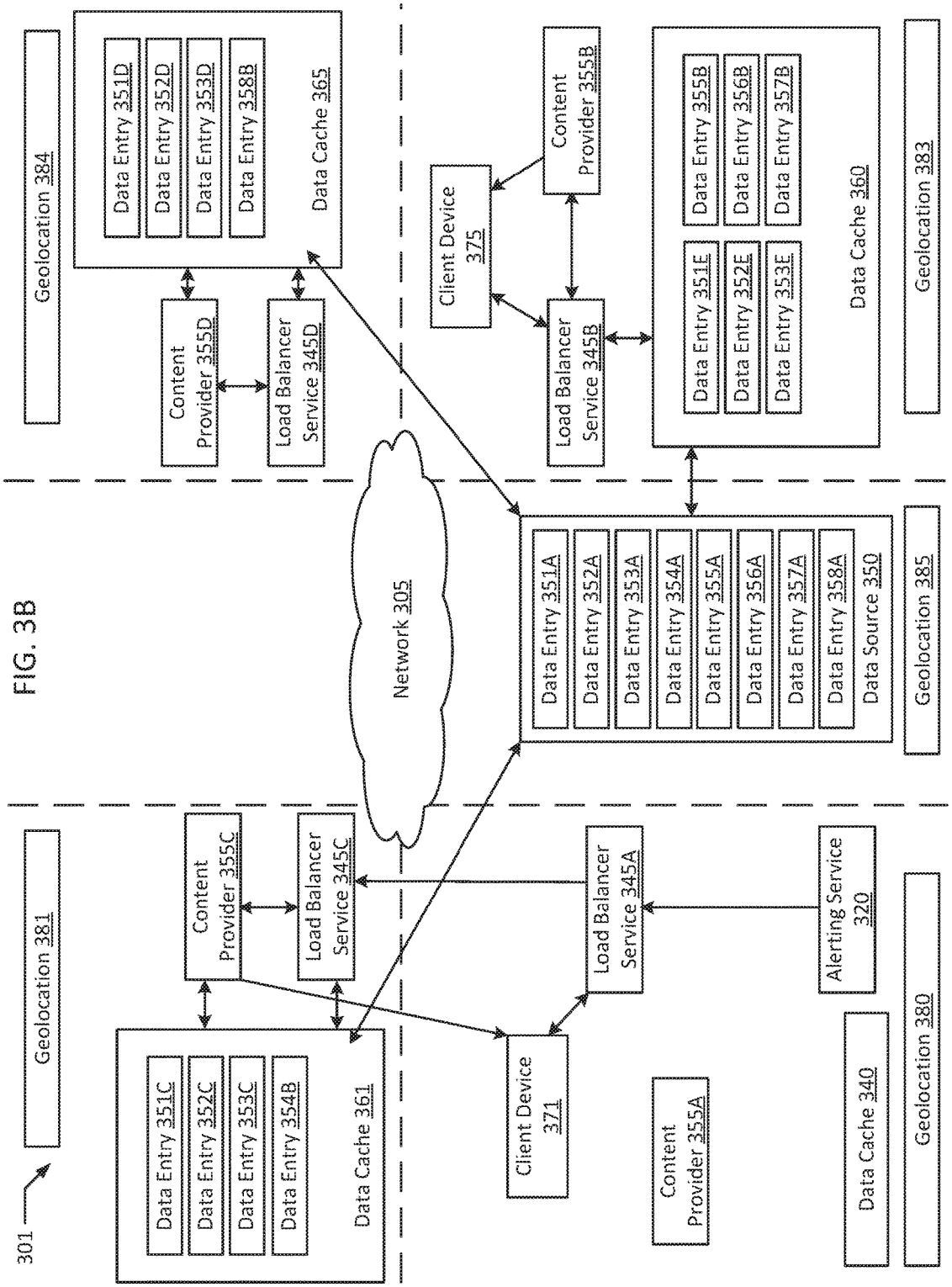

FIGS. 3A-B are block diagrams of a geopartitioned data caching system improving service resiliency and redundancy for delivering content in the event of a natural disaster according to an example of the present disclosure. In an example, geopartitioned data caching may also be tuned to provide high availability of data rather than being optimized for low latency access. In illustrated example system 300 on FIG. 3A, geolocation 380 may be in Oakland, Calif., Geolocation 385 in Salt Lake City, Utah, and geolocation 383 in Seattle, Wash. In the example, a load balancer service 345A is associated with a content provider 355A and a data cache 340, all executing in or near geolocation 380 and serving the Bay Area in California. For example, content provider 355A may be a news organization that specializes in local news, with local news articles for the Bay Area cached as data entries 351B-353B. In an example, client device 371 accesses the news organization for articles in data entries 351B-353B through load balancer service 345A. In an example, content provider 355B is a second site from the same news organization specializing in Seattle, Wash. area news, with articles cached as data entries 355B-357B, accessed by client devices 375 and 376 through load balancer service 345B as a gateway. In an example, data source 350 may be a backup repository for the news organization's articles nationally located, for example, in a lower cost area. In an example, alerting service 320 may be a earthquake detector located on the San Andreas fault, capable of providing 8-10 seconds of warning before an earthquake hits San Francisco. In an example, communication between the various components of system 300 may occur over a network 305 which may include a public network (e.g., the internet).

In an example, illustrated system 301 in FIG. 3B is system 300 after alerting service 320 detects an earthquake. In the example, geolocation 381 may be in San Diego, Calif., and geolocation 384 in Las Vegas, Nev., each with its own instance of the news organization site (e.g., content providers 355C-D), gateway (load balancer services 345C-D), and data cache (data caches 361 and 365). In an example, after alerting service 320 sends news of the earthquake to load balancer service 345A, load balancer service 345A may begin directing requests away from the Bay Area infrastructure to avoid any service discontinuity due to impending damage. In an example, due to the local nature of the news provided by content provider 355A-D, under circumstances with no active natural disaster or other emergency situation, a request for articles regarding a distant city would be rerouted to that city's instance of content provider 355A-D, for example, via an associated gateway (e.g., load balancer services 345A-D). In an example, due to the earthquake in the Bay Area, data entries normally cached on data cache 340 (e.g., data entries 351B-354B) are forwarded to data caches serving neighboring geographical regions, both for redundancy and in anticipation of significant traffic volume increase due to users around the country researching the quake. In an example, data cache 361 receives data entries 351C-353C to add to data entry 3354B (e.g., local news from San Diego, Calif.), while data cache 384 receives data entries 351D-353D to add to data entry 358B (e.g., local news from Las Vegas, Nev.), and data entries 351E-353E are added to Seattle, Wash. data entries 355B-357B in data cache 360.

In an example, load balancer service 345A, content provider 355A, data cache 340, and/or data source 350 may instruct content provider 355A and/or data cache 340 to be temporarily disconnected from network 305. In the example, queries for earthquake news are then served by regional nodes near the impacted site without risking using damaged infrastructure for a suboptimal user experience. In an example, a query about the earthquake is served from one of geolocation 381 (e.g., San Diego), 383 (e.g., Seattle), or geolocation 384 (e.g., Las Vegas). In the example, even a query from client device 371 located physically in the Bay Area may be redirected to a close by node outside of the Bay Area. In the example, client device 375 in Los Angeles searching about the earthquake may connect to load balancer service 345B and content provider 355B, and the article may be served from data cache 360.

Figure 4:
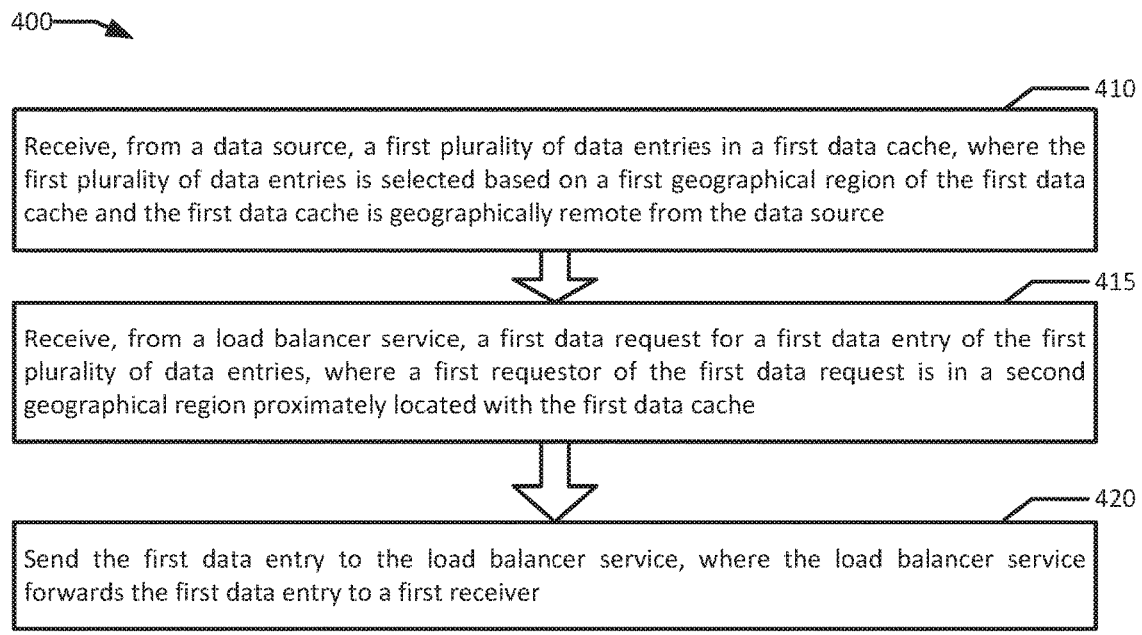
FIG. 4 is a flowchart illustrating geopartitioned data caching according to an example of the present disclosure.

FIG. 4 is a flowchart illustrating geopartitioned data caching according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method is performed by data cache 140.

Method 400 may include receiving, from a data source, a first plurality of data entries in a first data cache, where the first plurality of data entries is selected based on a first geographical region of the first data cache and the first data cache is geographically remote from the data source (block 410). In an example, data cache 140 located in geolocation 180 receives data entries 152B-154B from data source 150 in geographically remote geolocation 185, based on a geographical region of data cache 140. In an example, data cache 140 may include one or more cache data stores (e.g., cache data store 142) which may be associated with separate applications or services whose data are stored in data cache 140. In an example, data cache 140 may store data entries 152B-154B in memory to further enhance performance. In an example, load balancer service 145A is associated with a network service that uses data from data cache 140, for example, an advertisement bidding agency. In an example, load balancer service 145A is collocated with data cache 140. In the example, load balancer service 145A may be located on the same virtual server, same physical server, same rack, and/or same data center as data cache 140. In an example, data source 150 stores a larger set of data entries (e.g., data entries 152A-159A) of which data entries 152B-154B are a subset of the larger group of data entries on data source 150. In an example, data entries 152A-159A may be user profile entries for different users of the load balancer services 145A-B connecting from client devices 172, 175, and 176. For example, data entries 152A-159A may be purchase and demographic history data associated with placing advertisements for their respective users.

A first data request for a first data entry of the first plurality of data entries is received from a load balancer service, where a first requestor of the first data request is in a second geographical region proximately located with the first data cache (block 415). In an example, data cache 140 receives a data request for data entry 152B from load balancer service 145A, where the requestor of the data request (e.g., an operator or user of client device 172) is in a geographic region proximately located with data cache 140. For example, geolocation 180 where data cache 140 is located is Secaucus, N.J., client device 172 may be located anywhere within a geographical region served by data cache 140 (e.g., New York City and its suburbs). In some examples, where data cache density is high, multiple data caches may divide up one city into different service areas. On the other extreme, in areas of the Midwest where New York City may equal the population of several large states, a geographical region served by, for example, an Omaha, Nebr. data cache may serve all of North Dakota, South Dakota, Nebraska, Kansas, Wyoming, and Iowa. In an example, the first request is routed to load balancer service 145A, for example, instead of load balancer service 145B, because of a location of client device 172. In the example the location of client device 172 may be determined by any suitable method, such as GPS, network address, MAC address, IP address, phone number, wifi connectivity, radio triangulation, or metadata transmission.

The first data entry is sent to the load balancer service, where the load balancer service forwards the first data entry to a first receiver (block 420). In an example, data entry 152B is retrieved from data cache 140 and sent to load balancer service 145A. In an example, data entry 152B may be sent directly to client device 172. In another example, data entry 152B may be an input for further processing by load balancer service 145A. For example, data entry 152B may be profile information associated with a user of client device 172. In the example, load balancer service 145A may be an advertisement auction engine that packages the profile information in data entry 152B along with information from the content provider of the content containing the ad impression and advertiser specific configurations to create ad bid requests that are sent to advertisers (e.g., advertisers 255A, 256A, and 257). In an example, different advertisers (e.g., advertisers 255A, 256A, and 257) may have different advertiser specific settings, which may be configured on load balancer service 145A and/or data cache 140. In the example, advertiser 257 may be a local advertiser for the New York City market without a wider presence, and therefore settings attributable to advertiser 257 may be absent from load balancer service 145B and/or data cache 160 located in geolocation 182 away from geolocation 180 (e.g., Chicago). In an example, load balancer service 145A generates a plurality of ad bid requests (e.g., to each of advertisers 255A, 256A, and 257) as a result of a client device (e.g., client device 172, 175, or 176) accessing web content 250. In an example, the plurality of ad bid requests is sent to advertisers 255A, 256A, and 257 due to each of them being located in a geographical location proximate or overlapping with data cache 140 in geolocation 180 (e.g., Secaucus, N.J.). For example, advertisers 255A and 256A may also have servers located in Secaucus N.J., while advertiser 257 may be in Manhattan, N.Y.

In an example, data cache 140 receives, from load balancer service 145A, a second data request for data entry 156B, where the a second requestor of the second data request is located in a second geographical region and data entry 156B is stored in data cache 160. For example, a second requestor (e.g., user of client device 176) may also currently be in the New York Metropolitan area served by data cache 140. In the example, data entry 156B associated with client device 176 may be stored in data cache 160 in geolocation 182 (e.g., Chicago). In an example, data entry 152B may include profile information for the first requestor while data entry 156B may include profile information for the second requestor.

In an example, the load balancer service 145A and/or data cache 140 rejects the second data request based on failing to locate data entry 156B in data cache 140, where the data entry 156B is available from data source 150, for example, in the form of data entry 156A. In an example, data cache 140 retrieves data entry 156B from data source 150 after rejecting the second data request, and sends data entry 156B to the load balancer service 145A upon receiving a third data request for data entry 156B from the second requestor. In an example, load balancer service 145A and/or data cache 140 may forfeit successfully completing the first data request due to a retrieval time for data entry 156A from data source 150, but may instead treat the first data request as a signal to prepare data cache 140 for a future data request for data entry 156A, for example, by preloading data entry 156A to data cache 140 in the form of data entry 156C. Therefore, after failing one on one request, data cache 140 may be primed to respond to an immediate subsequent request from the second requestor navigating to a new page of content in web content 250. In an example, load balancer service 145A cancels a plurality of ad bid requests associated with the second data request based on data cache 140 rejecting the second data request.

In an example, client device 176 ordinarily accesses load balancer service 145B (e.g., a separate instance of load balancer service 145A), which may be collocated with data cache 160 in geolocation 182 (e.g., Chicago). In the example, prior to sending the second data request, the previous connection of client device 176 to the load balancer service was through load balancer service 145B from O'Hare airport northwest of Chicago, which may be a geographical region proximately located to data cache 160 in Chicago.

Figure 5:
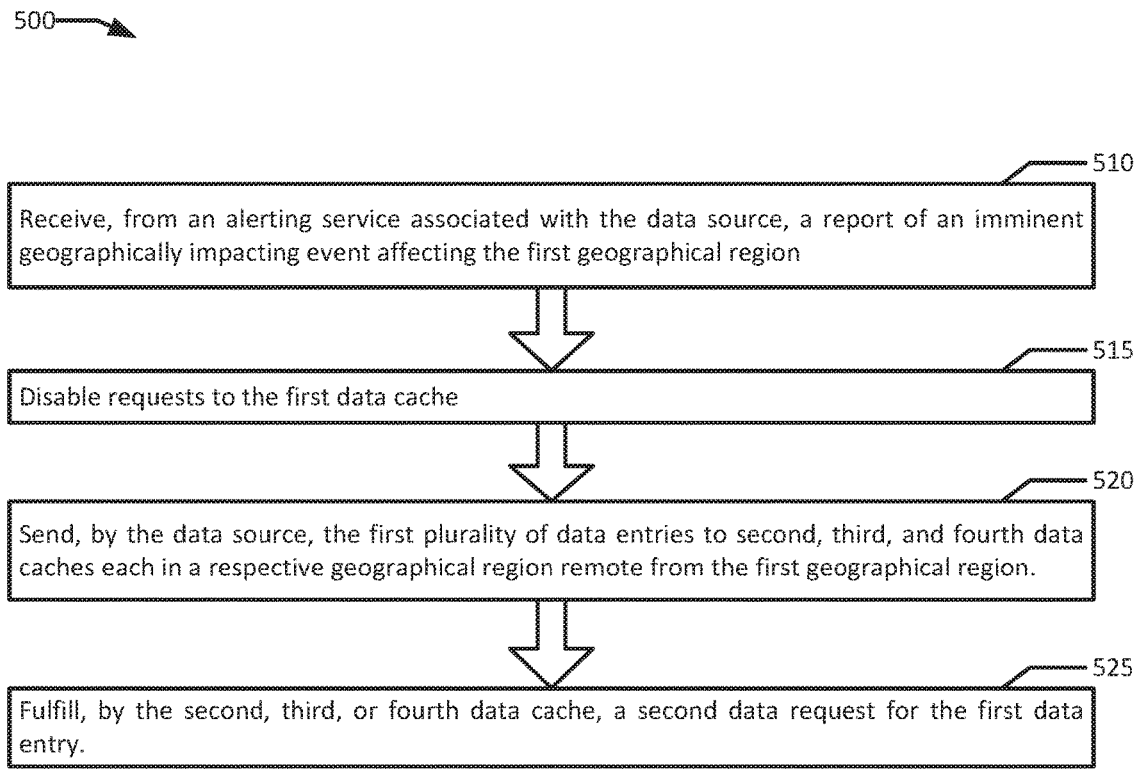
FIG. 5 is a flowchart illustrating geopartitioned data caching according to an example of the present disclosure.

FIG. 5 is a flowchart illustrating geopartitioned data caching according to an example of the present disclosure. Although the example method 600 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both. In an example, the method is performed by a load balancer service 345A in conjunction with an alerting service 320 and a data cache 340.

In an example, an embodiment of geopartitioned data caching configured for redundancy and emergency response may execute on the same infrastructure as illustrated system 200 above configured for low latency operations, or on separate infrastructure for a separate, dedicated role. For example, data caches 140 and 160 may reserve storage space for caching data from other regions to help share processing load at times of peak traffic, or to reroute access due to an emergency.

A report of an imminent geographically impacting event affecting the first geographical region is received from an alerting service associated with the data source (block 510). In an example, alerting service 320 on the San Andreas Fault sends a report to load balancer service 345A in Oakland, Calif. that a large earthquake has started. In an example, alerting service 320 may be associated with data source 350, and may be a detection device of geographically impacting events (e.g., a seismograph, Doppler radar, satellite, etc.) and a reporting service of geographically impacting events (e.g., geological survey, weather service, news organization, etc.). In an example, upon receiving the report from alerting service 320 of the earthquake impacting the Bay Area, load balancer service 345A disables data cache 340 (block 515). For example, data cache 340 serving the Bay Area may be imminently affected by power outages and/or traffic surges due to requests for information, so load balancer service 345A pre-emptively reroutes traffic to other data caches in the region (e.g., data caches 360, 361, 365) to alleviate a potential bottleneck causing a user perceptible outage.

The first plurality of data entries is sent by the data source to a second data cache in a third geographical region remote from the first geographical region, a third data cache in a fourth geographical region remote from the first geographical region, and a fourth data cache in a fifth geographical region remote from the first geographical region (block 520). In an example, data source 150, in response to the alert from alerting service 320, forwards the cached contents of data cache 340 (e.g., Oakland) to data caches 360 (e.g., Seattle), 361 (e.g., San Diego), and 365 (e.g., Las Vegas). In an example, one of the second data cache, the third data cache, or the fourth data cache fulfills a second data request for the first data entry (block 525). For example, data cache 360 (e.g., Seattle), 361 (e.g., San Diego), or 365 (e.g., Las Vegas) now loaded with data entries 341C-E may respond to a request for data entry 342B on data cache 340 due to traffic redirection from load balancer service 345A. In some examples, load balancer service 345A may also be disabled so that users on client devices in the affected region (e.g., client device 371) automatically connect to another load balancer service instance (e.g., load balancer service 345C in Seattle). In an example, a new request for data entry 351A-E originates from the affected region geolocation 380 (e.g., the Bay Area proximately located to and including Oakland Calif.), for example, from client device 371. In another example, the request for data entry 351A-E may originate from a completely separate geographical region (e.g., geolocation 180 and New York City). In an example, data from alerting service 320 regarding the geographically impacting event is also cached in neighboring regions to allow for more robust access.

In an example where illustrated system 200 depicts a geopartitioned data cache system implemented by an advertisement bidding agency configured for reducing bidding latency, system 200 may also be flexibly reconfigured on short notice for resiliency in the event of a disaster. For example, a weather alerting service may notify load balancer service 145A that a hurricane will land in New York City. In the example, profile data (e.g., data entries 152A-154A) loaded to data cache 140 may be also loaded to data cache 160 (e.g., Chicago), as well as other data caches in Buffalo, N.Y. and Pittsburgh, Pa., unlikely to be affected by the storm. In an example, while data cache 140 and/or load balancer service 145A are affected by the hurricane, traffic may be rerouted to Chicago, Buffalo, and/or Pittsburgh. In the example, client device 172 accessing web content 250 from the New York metropolitan area has an ad impression forwarded to an instance of the advertisement bidding agency's Chicago, Buffalo, or Pittsburgh locations where bidding is successfully conducted by one of the regional instances of the load balancer service. In an example, the successful bid is from a regional advertiser where the bidding occurred. In another example, bidding is successful from a national advertiser with a New York presence. In an example, the successful ad is served from an advertiser node in the New York metropolitan region. In another example, the successful ad is served from a different region (e.g., where the bidding took place).

Figure 6:
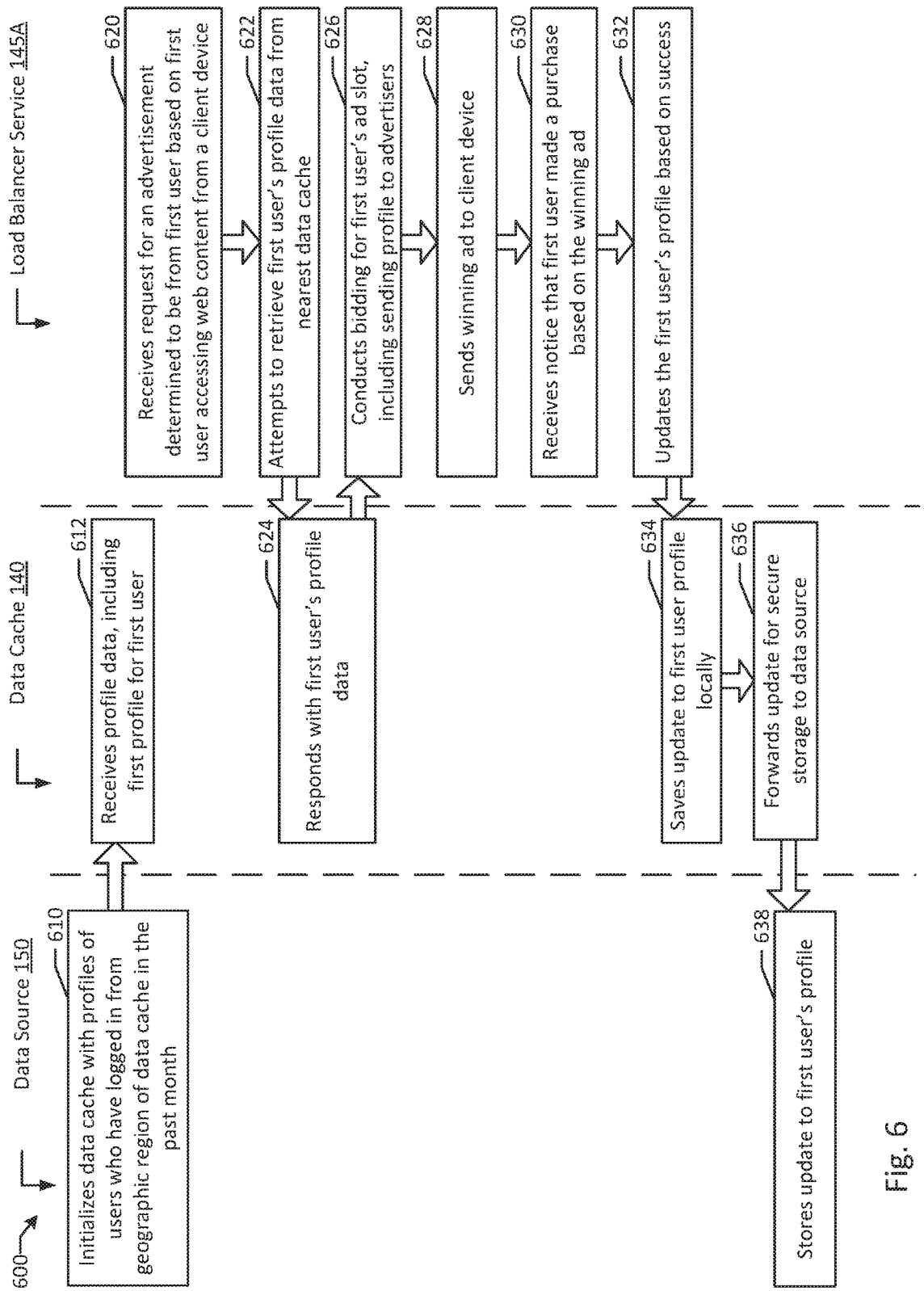
FIG. 6 is a flow diagram illustrating geopartitioned data caching reducing latency in an advertisement bidding system according to an example of the present disclosure.

FIG. 6 is a flow diagram illustrating geopartitioned data caching reducing latency in an advertisement bidding system according to an example of the present disclosure. Although the examples below are described with reference to the flowchart illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In example system 600, a data source 150, a data cache 140, and a load balancer service 145A combine to lower latency for advertisement bidding through geopartitioned data caching.

In system 600 as illustrated in FIG. 6, data source 150 initializes a new data cache with profiles of users who have logged in from the geographic region of the new data cache during the past month (block 610). In an example, data cache 140 receives profile data including a first profile (e.g., data entry 152B) of a first user to store in a cache data store 142 (block 612). In an example, load balancer service 145A receives a request for an advertisement determined to be from the first user based on the first user accessing web content 250 from client device 172 (block 620). In an example, load balancer service 145A attempts to retrieve the first user's profile data (e.g., data entry 152B) from the nearest data cache 140 (block 622). In an example, data cache 140 responds with the first user's profile data (e.g., data entry 152B) (block 624). In an example, load balancer service 145A conducts bidding for the first user's ad slot from accessing web content 250, including sending the profile (e.g., data entry 152B) to advertisers 155A, 156A, and 157 (block 626). In an example, the winning ad is sent to client device 172 (block 628). In some examples load balancer service 145A may forward the winning ad, in other examples, the winning ad may be sent directly from the advertisers 155A, 156A, and 157 to client device 172. In an example, load balancer service 145A receives notice that the first user of client device 172 made a purchase based on the winning ad (block 630). In the example, load balancer service 145A updates the first user's profile (e.g., data entry 152B) based on the successful placement and purchase (block 632). In an example, data cache 140 first saves the updated data entry 152B locally (block 634). In the example, data cache 140 later forwards the updated profile to data source 150 for secure storage, for example, as part of a nightly backup procedure (block 636). In an example, data source 150 updates data entry 152A with the update to the first user's profile (block 638).

Figure 7:
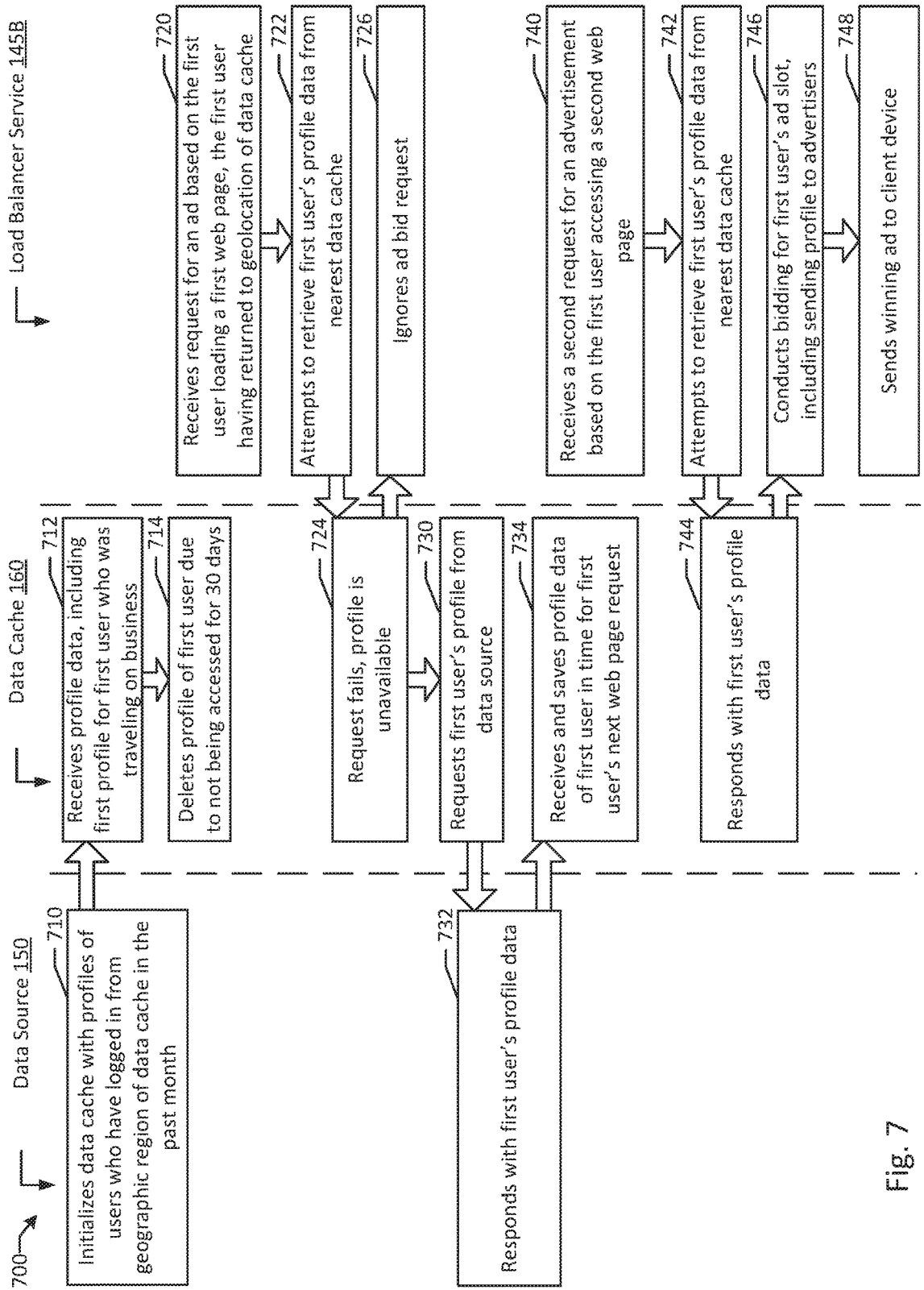
FIG. 7 is a flow diagram illustrating data cache updating in a geopartitioned data caching system according to an example of the present disclosure.

FIG. 7 is a flow diagram illustrating data cache updating in a geopartitioned data caching system according to an example of the present disclosure. Although the examples below are described with reference to the flowchart illustrated in FIG. 7, it will be appreciated that many other methods of performing the acts associated with FIG. 7 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In example system 700, a data source 150, a data cache 140, and a load balancer service 145B combine to react to lower latency for advertisement bidding for a traveling client device through geopartitioned data caching.

In system 700 as illustrated in FIG. 7, data source 150 initializes a new data cache 160 with profiles of users who have logged in from the geographic region of the new data cache 160 (e.g., Chicago metropolitan area) during the past month (block 710). In an example, data cache 160 receives profile data including a first profile (e.g., data entry 152B) of a first user to store in a cache data store 162 because the first user of client device 172 was in Chicago on a business trip during the initialization period of data cache 160 (block 712). In an example, data cache 160 deletes the profile of the first user after not being accessed for 30 days due to returning home to New York (block 714).

In an example, load balancer service 145B receives a request for an ad based on the first user of client device 172 loading a webpage from web content 250 when the first user returns to the geolocation of data cache 160 (e.g., Chicago) (block 720). In an example, load balancer service 145B attempts to retrieve the first user's profile data (e.g., data entry 152A) from the nearest data cache 160 (block 722). In an example, data cache 160 no longer has a copy of data entry 152A so the request fails because the profile is unavailable (block 724). In an example, load balancer service 145B ignores the ad bid request (block 726). While the first user is reading the first page from web content 250, data cache 160 requests a copy of data entry 152A from data source 150 (block 730). In an example, data source 150 responds with a copy of data entry 152A (e.g., the first user's profile data) (block 732). In the example, data cache 160 receives and saves the profile data for the first user in time for the first user's next web page request (block 734).

In an example, load balancer service 145B receives a second request for an ad based on the first user of client device 172 loading a webpage from web content 250 (block 740). In an example, load balancer service 145B attempts to retrieve the first user's profile data (e.g., data entry 152A) from the nearest data cache 160 (block 742). In an example, data cache 160 responds with the first user's profile data (block 744). In an example, load balancer service 145B conducts bidding for the first user's ad slot from accessing web content 250, including sending the profile (e.g., data entry 152B) to advertisers 155B, 156B, and 158 (block 746). In an example, the winning ad is sent to client device 172 (block 748).

Figure 8:
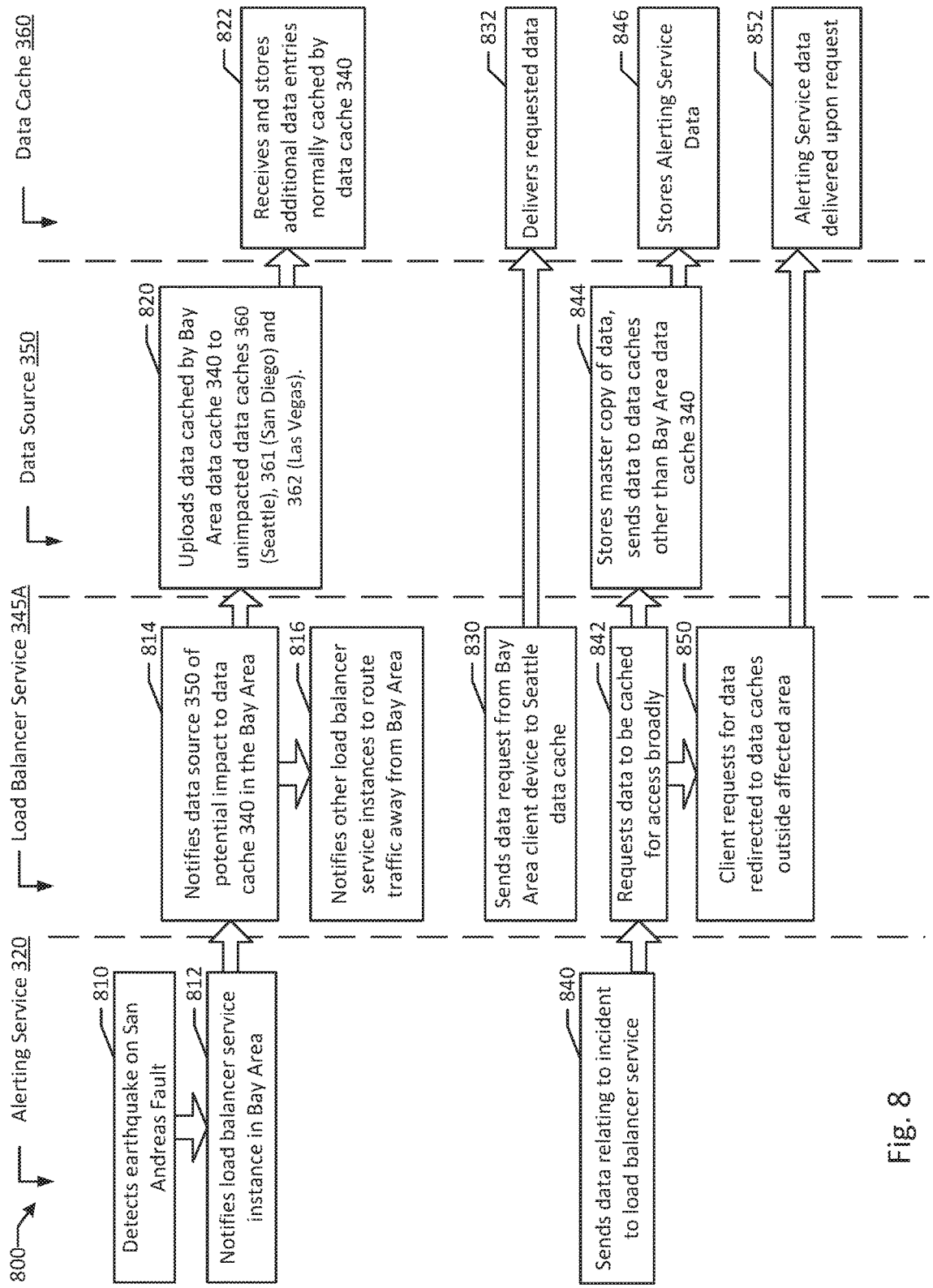
FIG. 8 is a flow diagram illustrating a geopartitioned data caching system serving disaster data with high availability according to an example of the present disclosure.

FIG. 8 is a flow diagram illustrating a geopartitioned data caching system serving disaster data with high availability according to an example of the present disclosure. In an example, alerting service 320 detects an earthquake on the San Andreas Fault 810 (block 810). In the example, alerting service 320 notifies load balancer service 345A in the Bay Area (block 812). In the example, load balancer service 345A notifies data source 350 of the potential impact to data cache 340 in the Bay Area (block 814). Load balancer service 345A continues to notify other load balancer service instances (e.g., load balancer services 345B-D) to route traffic away from the Bay Area (block 816). In an example, data source 350 uploads the data cached in Bay Area data cache 340 to unimpacted data caches 360 (Seattle), 361 (San Diego) and 362 (Las Vegas) (block 820). In an example, data cache 360 receives and stores additional data entries 351C-353C normally cached by data cache 340 (block 822).

In an example, load balancer service 345A sends a data request from Bay Area client device 371 to Seattle data cache 360 (block 830). In the example, data cache 360 delivers data entry 351C as requested (block 832). In an example, alerting service 320 sends data relating to the incident (e.g., notice of an aftershock) to load balancer service 345A (block 840). In an example, load balancer service 345A requests for the aftershock data to be cached for access broadly (block 842). In the example, data source 350 stores a master copy of the aftershock data and sends the data to data caches outside of the Bay Area (e.g., excluding data cache 340) (block 844). In an example, data cache 360 in Seattle stores the aftershock data from alerting service 320 (block 846). In an example, client requests for aftershock data are redirected by load balancer service 345A to data caches outside the affected Bay Area (block 850). In the example, data cache 360 in Seattle delivers the alerting service 320 aftershock data upon request (block 852).

Geopartitioned data caching may advantageously deliver significant performance increases by reducing latency, especially where the data being retrieved is very regional and where failure to deliver is an option. In a real-time transaction environment where microseconds count, delay may equate to failure, so the time saved on successful data retrieval from a geopartitioned cache may be the difference between getting a bid in on time and sitting out a round of an auction. In such an environment, failure to find data in time results in the same consequences as ignoring a request, and therefore very localized caching, with rapid retrieval capabilities from a master data store, can be determinative in terms of whether a transaction is possible. By cutting out the necessity of a central data store retrieval, typically 60-200 ms in data retrieval time may be saved. In addition, by compartmentalizing data caches into smaller units, they may be more flexibly deployed with lesser hardware constraints, and also scaled up rapidly through cloud hosting providers. The behavioral characteristics of geopartitioned data caching used in a latency reduction configuration are especially advantageous in ad bidding, because the cost of failure is low (e.g., another ad impression will come very soon) and because the penalty for stale data is very low (e.g., basic profile demographics don't change based on whether or not the latest purchase of diapers has been factored in). Therefore having regional caches falling slightly out of sync does not significantly affect the quality of ad placements based on a user's profile. Simultaneously, infrastructure utilized to implement geopartitioned data caching for performance purposes may quickly be transitioned to providing disaster recovery and resiliency roles by modifying the geographic parameters factored into the caching. Therefore the infrastructure and deployment investments may be multipurpose, synergistically resulting in a very efficient utilization of resources.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system of geopartitioned data caching, the system comprising:
   a data source connected over a network to a first data cache of a plurality of data caches, wherein the first data cache is geographically remote from the data source, and the first data cache stores a first plurality of data entries selected based on a first geographical region of the first data cache; and
   a host node with one or more processors and a memory, the host node hosting:
      the first data cache; and
      a first load balancer service configured to communicate with a nearest data cache among the plurality of data caches, and the first data cache is the nearest data cache to the first load balancer service, wherein the first load balancer service is configured to send advertisement bid requests to advertisers based on receiving advertisement requests;
   wherein the one or more processors on the host of the first data cache execute to:
   receive, from the first load balancer service, a first data request for a first data entry associated with a first advertisement bid request, wherein the first data entry is available in the data source, and a first requestor of the first data request is in a second geographical region proximately located with the first data cache;

query, based on the first data request, the first data cache to determine whether the first data cache includes the first data entry;

responsive to determining that the first data cache lacks the first data entry, reject, by the first data cache, the first data request, and after rejecting the first data request, retrieve by the first data cache, the first data entry from the data source; and responsive to the first data cache rejecting the first data request, cancel, by the first load balancer service, the first advertisement bid request to a first advertiser.

2. The system of claim 1, wherein the data source stores a second plurality of data entries, and the first plurality of data entries is a subset of the second plurality of data entries.

3. The system of claim 1, wherein the first data entry includes a first profile of the first requestor, and a second data entry includes a second profile of the second requestor.

4. The system of claim 3, wherein the one or more processors execute further to:

receive, from the first load balancer service, a second data request for the second data entry, wherein a second requestor of the second data request is located in the second geographical region and the second data entry is stored in the first data cache; and send the second data entry to the first load balancer service, wherein the first load balancer service incorporates the second data entry into at least one advertisement bid request to at least one advertiser.

5. The system of claim 1, wherein the first data cache sends the first data entry to the first load balancer service upon receiving a second data request for the first data entry from the first requestor.

6. The system of claim 5, wherein the first load balancer service incorporates the first data entry in a plurality of advertisement bid requests associated with the second data request, sent to a respective plurality of advertisers.

7. The system of claim 6, wherein the plurality of advertisement bid requests is generated based on a web content retrieved by the first requestor through a network accessible device.

8. The system of claim 7, wherein a second advertiser of the plurality of advertisers is selected to receive a second advertisement bid request of the plurality of advertisement bid requests based on the second advertiser being located in a third geographical region proximately located with the first data cache.

9. The system of claim 1, wherein a previous connection by the first requestor to a second load balancer service was from a third geographical region proximately located with a second data cache which stored the first data entry, and the second data cache is geographically separated from the first data cache.

10. The system of claim 1, wherein the first load balancer service cancels a plurality of advertisement bid requests based on the data cache rejecting the first data request.

11. The system of claim 1, wherein a second load balancer service is collocated with a second data cache.

12. The system of claim 1, wherein the data source is associated with an alerting service and the alerting service is at least one of a detection device of geographically impacting events and a reporting service of geographically impacting events.

13. The system of claim 12, wherein the alerting service reports an imminent geographically impacting event affecting the first geographical region, and the first load balancer service disables requests to the first data cache.

14. The system of claim 13, wherein a second data cache in a third geographical region remote from the first geographical region, a third data cache in a fourth geographical region remote from the first geographical region, and a fourth data cache in a fifth geographical region remote from the first geographical region are sent the first plurality of data entries by the data source.

15. The system of claim 14, wherein a second data request for the first data entry is fulfilled by one of the second data cache, the third data cache, and the fourth data cache.

16. The system of claim 15, wherein the second data request originates from the first load balancer service in the first geographical region.

17. The system of claim 15, wherein the second data request originates from a sixth geographical region separate from the first geographical region, the third geographical region, the fourth geographical region, and the fifth geographical region.

18. The system of claim 14, wherein the first data entry includes a first profile of the first requestor, and the first profile is loaded to at least one of the second data cache, the third data cache, and the fourth data cache.

19. The system of claim 18, wherein the first profile is sent with a second advertisement bid request from at least one of the third geographical region, the fourth geographical region, and the fifth geographical region to a plurality of advertisers, and the first requestor receives an advertisement.

20. The system of claim 1, wherein the first requestor previously accessed a second load balancer service associated with a second data cache and a first copy of the first data entry in the second data cache was updated with a first change, the first data cache retrieves a second copy of the first data entry from the data source prior to the data source being updated with the first change, and the first load balancer service incorporates the non-updated second copy of the first data entry into a second advertisement bid request.

21. The system of claim 20, wherein the first requestor responds to an advertisement displayed to the first requestor based on the second advertisement bid request, resulting in a second change being recorded to the second copy of the first data entry.

22. The system of claim 21, wherein the first data entry in the data source is updated with both the first change and the second change after both changes are made.

23. A method of geopartitioned data caching, the method comprising:

receiving, from a data source, a first plurality of data entries in a first data cache, wherein the first plurality of data entries is selected based on a first geographical region of the first data cache and the first data cache is geographically remote from the data source, and wherein a load balancer service hosted on a same host node as the first data cache is configured to communicate with a nearest data cache among the plurality of data caches, and the first data cache is the nearest data cache to the load balancer service;

receiving, from the load balancer service, a first data request for a first data entry associated with a first advertisement bid request, wherein the load balancer service is configured to send advertisement bid requests to advertisers based on receiving advertisement requests, wherein the first data entry is available in the data source, and a first requestor of the first data request is in a second geographical region proximately located with the first data cache;

querying, based on the first data request, the first data cache to determine whether the first data cache includes the first data entry;

responsive to determining that the first data cache lacks the first data entry, canceling, by the load balancer service, the first advertisement bid request to a first advertiser and retrieving, by the first data cache, the first data entry from the data source.

24. The method of claim 23, wherein the first data entry includes a first profile of the first requestor, and a second data entry includes a second profile of a second requestor, the method further comprising:

receiving, from the load balancer service, a second data request for a second data entry, wherein the second requestor of the second data request is located in the second geographical region and the second data entry is stored in the first data cache;

sending the second data entry to the load balancer service, wherein the load balancer service incorporates the second data entry into at least one advertisement bid request to at least one advertiser.

25. The method of claim 24, wherein the first data cache sends the first data entry to the load balancer service upon receiving a third data request for the first data entry from the first requestor.

26. The method of claim 24, wherein a previous connection by the first requestor to the load balancer service was from a third geographical region proximately located with a second data cache, and the second data cache is geographically separated from the first data cache.

27. The method of claim 25, wherein the load balancer service includes the first profile in a plurality of advertisement bid requests sent to a respective plurality of advertisers and a second advertiser of the plurality of advertisers is selected to receive a second advertisement bid request of the plurality of advertisement bid requests based on the second advertiser being located in a third geographical region proximately located with the first data cache.

28. The method of claim 23 further comprising:

receiving, from an alerting service associated with the data source, a report of an imminent geographically impacting event affecting the first geographical region; and disabling requests to the first data cache.

29. The method of claim 23 further comprising:

sending, by the data source, the first plurality of data entries to a second data cache in a third geographical region remote from the first geographical region, a third data cache in a fourth geographical region remote from the first geographical region, and a fourth data cache in a fifth geographical region remote from the first geographical region.

30. The method of claim 29 further comprising:

fulfilling, by one of the second data cache, the third data cache, and the fourth data cache, a second data request for the first data entry.

31. The method of claim 29, wherein the first data entry includes a first profile of the first requestor, the first profile is loaded to at least one of the second data cache, the third data cache, and the fourth data cache, and wherein the first profile is sent with a second advertisement bid request from at least one of the third geographical region, the fourth geographical region, and the fifth geographical region to a plurality of advertisers resulting in the first requestor receiving an advertisement.

32. A computer-readable non-transitory storage medium storing executable instructions of geopartitioned data caching, which when executed by a computer system, cause the computer system to:

receive, from a data source, a first plurality of data entries in a first data cache, wherein the first plurality of data entries is selected based on a first geographical region of the first data cache and the first data cache is geographically remote from the data source, and wherein a load balancer service hosted on a same host node as the first data cache is configured to communicate with a nearest data cache among the plurality of data caches, and the first data cache is the nearest data cache to the load balancer service;

receive, from the load balancer service hosted on a same host node as the first data cache, a first data request for a first data entry associated with a first advertisement bid request, wherein the load balancer service is configured to send advertisement bid requests to advertisers based on receiving advertisement requests, wherein the first data entry is available in the data source, and a first requestor of the first data request is in a second geographical region proximately located with the first data cache;

query, based on the first data request, the first data cache to determine whether the first data cache includes the first data entry;

responsive to determining that the first data cache lacks the first data entry, cancel, by the load balancer service, the first advertisement bid request to a first advertiser and retrieve, by the first data cache the first data entry from the data source.

* * * * *